US011797088B2

(12) United States Patent
Eraslan et al.

(10) Patent No.: US 11,797,088 B2
(45) Date of Patent: Oct. 24, 2023

(54) LOCALIZED HAPTIC FEEDBACK ON FLEXIBLE DISPLAYS

(71) Applicant: FLEXTRONICS AP, LLC., San Jose, CA (US)

(72) Inventors: Mesut Eraslan, San Jose, CA (US); Eric Hoarau, San Jose, CA (US); Sven Kuzinna, San Jose, CA (US)

(73) Assignee: FLEXTRONICS AP, LLC., San Jose, CA (US)

( * ) Notice: Subject to any disclaimer, the term of this patent is extended or adjusted under 35 U.S.C. 154(b) by 0 days.

(21) Appl. No.: 15/637,926

(22) Filed: Jun. 29, 2017

(65) Prior Publication Data

US 2018/0004294 A1 Jan. 4, 2018

Related U.S. Application Data

(60) Provisional application No. 62/357,914, filed on Jul. 1, 2016.

(51) Int. Cl.
*G06F 3/01* (2006.01)
*G06F 3/041* (2006.01)
*G06F 3/04886* (2022.01)
*G09G 3/3208* (2016.01)
*G06F 3/02* (2006.01)

(52) U.S. Cl.
CPC ............ *G06F 3/016* (2013.01); *G06F 3/0202* (2013.01); *G06F 3/0416* (2013.01); *G06F 3/04886* (2013.01); *G06F 3/0412* (2013.01); *G06F 2203/04102* (2013.01); *G09G 3/3208* (2013.01)

(58) Field of Classification Search
CPC ............... G06F 3/0414; G06F 3/04886; G06F 2203/04102
See application file for complete search history.

(56) References Cited

U.S. PATENT DOCUMENTS 4,857,887 A * 8/1989 Iten .................... H03K 17/9643
200/512
8,310,351 B2 11/2012 Krahenbuhl et al.
(Continued)

FOREIGN PATENT DOCUMENTS

CN 104035561 A 9/2014
KR 20140036846 A 3/2014

OTHER PUBLICATIONS

Korean Office Action dated Jun. 18, 2020 for the Korean Patent Application No. 10-2019-7003360.

*Primary Examiner* — William Boddie
*Assistant Examiner* — Bipin Gyawali
(74) *Attorney, Agent, or Firm* — Volpe Koenig

(57) ABSTRACT

A display system has a flexible display screen which has a front side and a back side, and a plurality of haptic elements arranged in an array on the back side of the screen. The display system also has a controller board connected to the plurality of haptic elements and the flexible display screen. The controller board is configured to display a plurality of interactive buttons on the front side of the flexible display screen in locations corresponding to the plurality of haptic elements. The plurality of haptic elements are configured to provide haptic feedback based on touch input provided to the front side of the screen. The haptic feedback includes actuating a haptic element which corresponds to the location of an interactive button selected by the touch input.

10 Claims, 5 Drawing Sheets

(56) References Cited

U.S. PATENT DOCUMENTS

| | | | |
|---|---|---|---|
| 8,593,409 B1 | 11/2013 | Heubel et al. | |
| 9,208,662 B2 | 12/2015 | Wang et al. | |
| 9,501,044 B2 | 11/2016 | Jackson et al. | |
| 9,829,977 B2* | 11/2017 | Heubel | G06F 3/041 |
| 11,079,816 B1* | 8/2021 | North | H10N 30/03 |
| 2005/0030292 A1 | 2/2005 | Diederiks | |
| 2008/0142352 A1* | 6/2008 | Wright | G06F 3/0446 |
| | | | 200/600 |
| 2009/0002328 A1* | 1/2009 | Ullrich | G06F 3/016 |
| | | | 345/173 |
| 2010/0079379 A1* | 4/2010 | Demuynck | G06F 3/0412 |
| | | | 345/169 |
| 2012/0075221 A1* | 3/2012 | Yasuda | H01L 27/20 |
| | | | 345/173 |
| 2012/0206371 A1* | 8/2012 | Turunen | G06F 3/016 |
| | | | 345/173 |
| 2013/0076649 A1* | 3/2013 | Myers | H04M 1/0268 |
| | | | 345/173 |
| 2013/0215079 A1 | 8/2013 | Johnson et al. | |
| 2014/0082490 A1* | 3/2014 | Jung | G06F 3/016 |
| | | | 715/702 |
| 2014/0340208 A1 | 11/2014 | Fasel et al. | |
| 2015/0091414 A1* | 4/2015 | Lonnberg | G06F 3/016 |
| | | | 310/330 |
| 2015/0169118 A1* | 6/2015 | Lee | G06F 3/016 |
| | | | 345/174 |
| 2016/0117022 A1* | 4/2016 | Kim | H03K 17/9643 |
| | | | 345/82 |
| 2016/0349854 A1* | 12/2016 | Hayes | A61G 7/05 |

\* cited by examiner

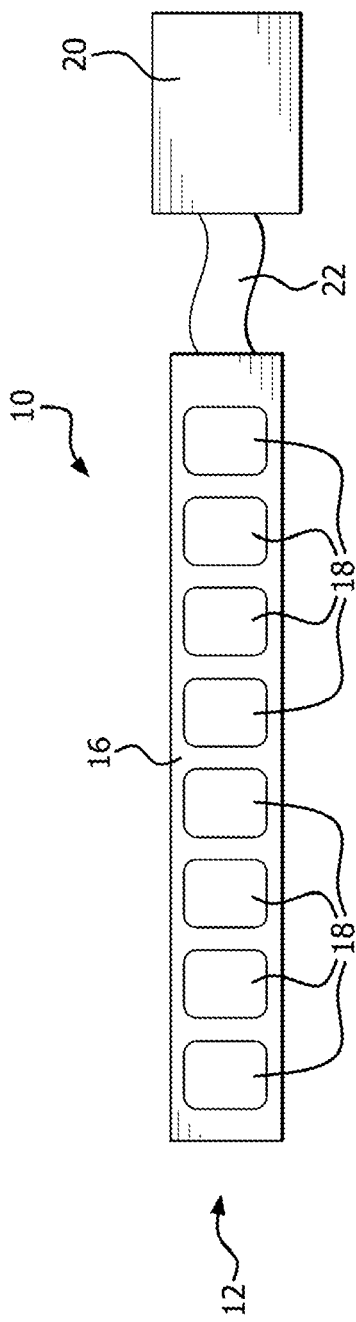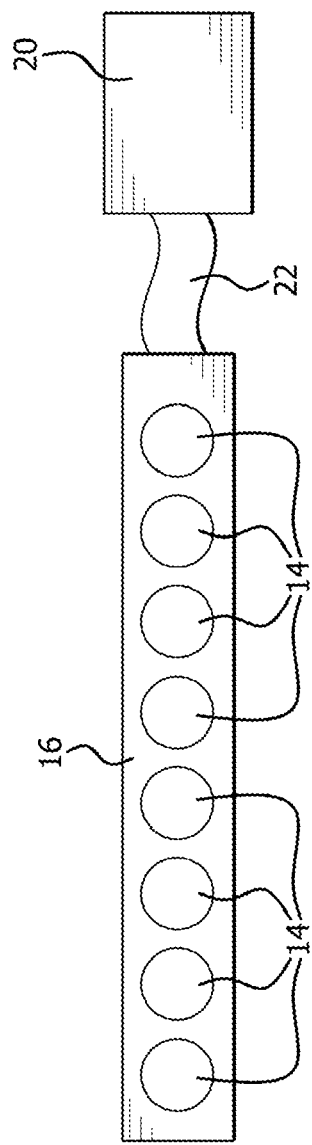

LOCALIZED HAPTIC FEEDBACK ON FLEXIBLE DISPLAYS

CROSS REFERENCE TO RELATED APPLICATIONS

This application claims the benefit of U.S. Provisional Patent Application No. 62/357,914, filed Jul. 1, 2016, which is incorporated by reference as if fully set forth herein

FIELD OF INVENTION

The present invention relates to flexible displays, and, more particularly, to a flexible display providing haptic feedback through an array of haptic elements.

BACKGROUND

Glass-based rigid displays with touch screens have been revolutionary in reinventing human interaction with machines. While capacitive touch increased accuracy and resolution and multi-touch and force touch gave significant additional functionality, all of these technologies lack the psychical feedback to the tip of the finger that a user gets when they push a mechanical button.

As touch screens are increasingly designed into automobiles, providing haptic feedback has become a more important and desirable feature. A display that provides haptic feedback to the driver when he touches the screen while driving allows him to interact with the display with less eye-time on the screen. In this way, the driver can keep his eyes more on the road and less on the screen when interacting with touch screen functions such as A/C or audio controls.

Some current vehicle systems provide broad haptic feedback on the display by vibrating the screen with various technologies, such as with piezo vibrators or sound waves, or by providing tingling sensation to the fingertip of the user using electroactive thin films on the surface. However, current technology is lacking a display configuration which provides accurate localized feedback which mimics the feeling of pressing a mechanical button and which is open to customization and integration into current vehicle and other systems.

The present disclosure is directed to overcoming one or more problems of current haptic feedback display systems, including providing an improved haptic feedback system to a flexible display.

SUMMARY

In one aspect, the present disclosure is directed to a display system. The display system includes a flexible display screen which includes a front side and a back side, and a plurality of haptic elements arranged in an array on the back side of the screen. The display system also includes a controller board connected to the plurality of haptic elements and the flexible display screen. The controller board is configured to display a plurality of interactive buttons on the front side of the flexible display screen in locations corresponding to the plurality of haptic elements. The plurality of haptic elements are configured to provide haptic feedback based on touch input provided to the front side of the screen. The haptic feedback includes actuating a haptic element which corresponds to the location of an interactive button selected by the touch input

BRIEF DESCRIPTION OF THE DRAWING(S)

The foregoing summary and the following detailed description will be better understood when read in conjunction with the appended drawings, which illustrate at least one preferred embodiment of the invention. In the drawings:

FIG. 1A is a schematic view of a front side of an exemplary flexible display having a single array of interactive buttons;

FIG. 1B is a schematic view of a rear side of an exemplary flexible display system having a single array of haptic elements;.

DETAILED DESCRIPTION

Figure 2A:
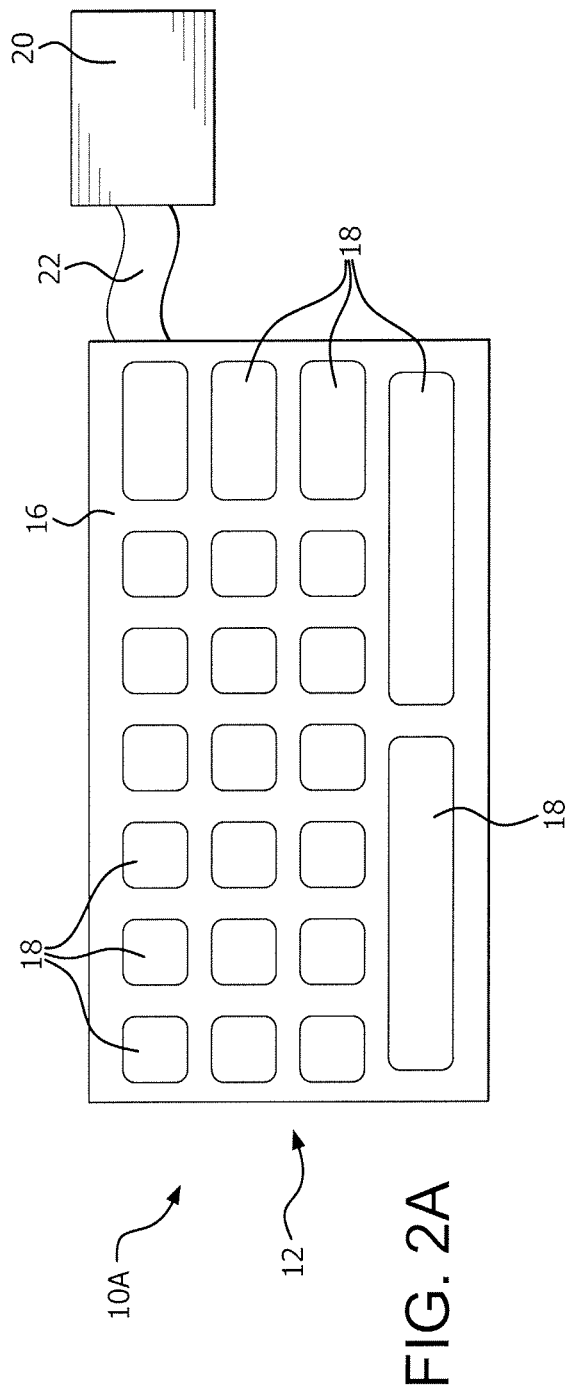
FIG. 2A is a schematic view of a front side of another exemplary display having multiple arrays of interactive buttons.

Disclosed embodiments pertain to a display system which may be implemented as a user interface in a variety of different environments. For example, the display system may be implemented in a vehicle as part of a dashboard user interface. The display system supports touch input and provides haptic feedback to the user based on the location of touch. This interaction simulates the effect of pressing a conventional button or switch. An array of haptic elements present in the display system provide haptic feedback at various locations on the display to match the elements displayed to the user. The use of a flexible display in combination with the plurality of spaced-apart haptic elements further enables the system to localize the haptic feedback to the particular locations where the touch input is provided. Additional advantages are also realized through the disclosed configuration and will be discussed in more detail.

FIGS. 1A and 1B illustrate an exemplary embodiment of a display system 10. FIG. 1A includes a front view of the display system 10. FIG. 1B includes a rear view of the display system 10. The display system 10 includes a display 12 and a plurality of haptic elements 14. The display 12 includes a display screen 16 which is configured to generate one or more interactive buttons 18 which are visually presented on the display screen 16. The interactive buttons 18 indicate locations on the display screen 16 where a user may provide touch as input to generate an output result.

The haptic elements 14 and the display screen 16 are preferably connected to a controller board 20 by an electronic connector 22. The controller board 20 is preferably a computing element including at least a processor component and a memory component. The processing component may be configured to execute software instructions stored in the memory component or elsewhere. The controller board 20 may be a component of an overall computing system, such as vehicle computer, personal computer, mobile device, etc. The electronic connector 22 is preferably a cable, connector, wire, and/or system of components which enable electronic signals to be sent to and from the haptic elements 14 and the display screen 16. The controller board 20 receives signals from and transmits signals to the haptic elements 14 and/or display screen 16 via the electronic connector 22. In this way, the controller board 20 manages the display system 10 such that the display system 10 is an interactive device which provides interactive buttons 18 on the display screen 16.

While the display system 10 is illustrated in FIGS. 1A and 1B with a single controller board 20 and electronic connector 22, it should be understood that, in some embodiments, the haptic elements 14 and display screen 16 may be connected to the same controller board 20 by separate electronic connectors 22 or connected to separate controller boards 20. For example, the haptic elements 14 may include a dedicated controller which provides signals to actuate a selected one or more of the haptic elements to provide a haptic effect and/or receives a signal from one or more haptic elements 14 indicating touch registration. Similarly, the display screen 16 may include a dedicated controller which controls the images displayed on the display screen 16 (e.g., the appearance and configuration of the interactive buttons 18) and/or receives signals indicating a touch of the display screen 16. In these embodiments, the separate controllers may communicate with each other to coordinate input and output processing.

In an exemplary embodiment, the haptic elements 14 are piezoelectric discs which are configured to provide haptic feedback. The piezoelectric discs are configured to vibrate, shake, or otherwise move in response to an input signal (e.g., a drive signal) being applied. The piezoelectric discs are advantageous in that they can be formed as relatively thin parts. This allows the overall thickness of the display system 10 to be thin. While piezoelectric discs are described herein, it should be understood that other haptic devices may be used as the haptic elements 14.

In some embodiments, the haptic elements 14 are configured to record touch registration. In other words, the haptic elements 14, in addition to providing haptic feedback as output, are configured to receive and identify touch input from a user. The haptic element(s) 14 which identify the touch are configured to record the touch event by providing a signal to the controller board 20. Piezoelectric discs may be configured with electromechanical elements which identify touch (e.g., via changes in pressure, capacitance, conductivity, etc.) at the disc. In this configuration, the display screen 16 may configured as a passive screen which is not configured to identify touch registration. In other embodiments, the haptic elements 14 are only configured to provide haptic feedback and the display system 10 relies on the display screen 16 to perform touch registration.

The display screen 16 is an electronic display which includes a viewable area 24. The display screen 16 is configured to produce an image within the viewable area 24. The display screen 16 may utilize known digital techniques to produce the viewable image. For example, the controller board 20 may transmit digital signals via the electronic connector 22 which the display screen 16 may use to produce and display the viewable image. In this way, the controller board 20 is configured to produce and change the viewable image. As shown in FIG. 1A, the viewable image includes the plurality of interactive buttons 18.

The display screen 16 is flexible. The structure of at least one layer of the display screen 16 allows for resilient flexing and/or bending. The flexibility of the display screen 16 may provide multiple functionalities. First, the flexibility of the screen allows for localized feedback from one or more of the haptic elements 14. Application of a haptic effect (e.g., vibration) to a back surface of a rigid screen would primarily result in the effect being translated through the entire screen (e.g., the user could feel the haptic effect anywhere on the screen). However, when a haptic element applies a haptic effect to a particular location on a rear side of the display screen 16, the flexibility of the screen allows the haptic effect to be primarily translated at the corresponding location on the other side of the display screen. In other words, the user will only feel the haptic effect at the location of the haptic element 14. This location can be made to correspond to a location of an interactive button 18 viewable on the display screen 16. This effect helps to produce a more realistic feeling of "pressing" a button on the screen, as the effect is only felt at the location of the pressing.

The flexibility of the display screen 16 also allows for the transmission of a touch event through the display screen 16 and to a particular haptic element 14. If the display screen 16 was entirely rigid, a touch effect could be felt at more than one haptic element 14 regardless of where the touch was applied. With the flexible screen, the touch of an interactive button 18 can be translated into pressure which is applied only to a particular haptic element 14 which corresponds to that interactive button 18 (e.g., the haptic element 14 directly behind the interactive button 18). This functionality allows for the use of haptic elements 14 which are capable of touch registration. In such configurations, the display screen 16 may omit a touch registration layer, which helps to maintain the display screen 16 as an overall thin component.

The display screen 16 may use any of a variety of display technologies, including, for example, LED or LCD. In an exemplary embodiment, the display screen 16 is a flexible OLED screen. The self-emitting nature of OLED screens help the display screen 16 and overall display system 10 to remain relatively thin. The display screen 16 may include a touch registration feature which is connected to the controller board 20. The touch registration feature (for example, a touch registration layer of the display screen 16) may be configured to identify touch events and provide a signal to the controller board 20. The signal may identify the location of the touch event, which the controller board 20 may match to a corresponding interactive button 18. In other embodiments, the display screen 16 is a passive display matrix and the haptic elements 14 are configured to register touch events with the controller board 20.

FIGS. 1A and 1B illustrate an exemplary embodiment of the display system 10 in which the haptic elements 14 and interactive buttons 18 are formed as a one-dimensional array. In other words, a single line of haptic elements 14 are positioned on a rear side of the display screen 16 and a single line of interactive buttons 18 are correspondingly displayed in the viewable area 24 on the front side of the display screen 16. In this basic example, the haptic elements 14 and interactive buttons 18 are provided in a 1:1 ratio.

Figure 2B:
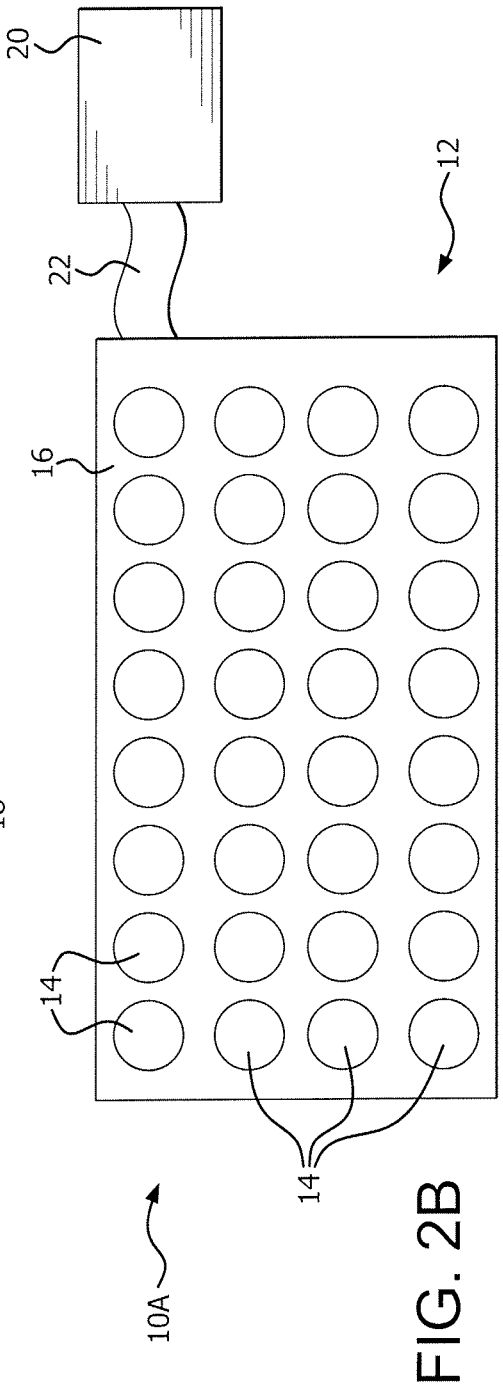
FIG. 2B is a schematic view of a rear side of another exemplary display having multiple arrays of haptic elements.

FIGS. 2A and 2B illustrate another embodiment of a display system 10A in which a two-dimensional array of haptic elements 14 and interactive buttons 18 are provided. FIG. 2A illustrates a front side of the display system 10A and FIG. 2B illustrates a rear side of the display system 10A. In this embodiment, the haptic elements 14 and interactive buttons 18 are arranged in a more complicated arrangement which includes rows in columns. However, it should be understood that the haptic elements 14 and interactive buttons 18 may be arranged in any configuration which is desired.

The interactive buttons 18 may be placed in any spatial configuration around the viewable area 24. The controller board 20 is configured to produce image signals which are transmitted to the display screen 16 and displayed in the viewable area as interactive buttons 18. The haptic elements 14 are arranged on a rear side of the display screen 16. In an exemplary embodiment, the locations of the haptic elements 14 on the rear side of the display screen 16 correspond to the locations of the interactive buttons 18 displayed on the front side of the display screen.

The customizable configuration of the interactive buttons 18 and the display screen 16 enables a variety of different uses for the display systems 10, 10A. For example, the disclosed display systems may be implemented in a vehicle as a dashboard control mechanism. In another example, the disclosed features may be implemented in keyboard embodiment.

Moreover, the use of a plurality of haptic elements 14 allows for different configurations of interactive buttons 18 in the same device at different times while maintaining the ability to provide haptic feedback at a particular location on the display screen 16. For example, the display screen 16 can display a first viewable image which includes interactive buttons 18 in a first layout and, after an interactive button 18 is selected, the display screen 16 can display a second viewable image which includes different media including a different layout of interactive buttons 18. In both layouts, the interactive buttons 18 can be located to correspond to locations of one or more haptic elements 14 on the opposite side of the display screen 16.

In one example, the display system 10 is used as a control element on a dashboard environment. The controller 20 may transmit signals to the display screen 16 to display a first image which includes a plurality of interactive buttons 18. The interactive buttons 18 in the first image may represent different auxiliary systems of the vehicle, such as multimedia, HVAC, navigation, etc. The user may select one of these interactive buttons 18 by touching the display screen 16 in the appropriate location. This action may cause a haptic element 14 which corresponds to the location of the selected interactive button 18 to produce a haptic effect. The haptic effect may be, for example, a vibration with a waveform that imitates the feeling of a mechanical button click such that the user feels that the interactive button 18 has been pressed.

The haptic element 14 which provides the haptic effect may be actuated by the haptic element 14 itself and/or through controller board 20. For example, in an embodiment in which the haptic elements 14 are capable of touch registration, the haptic element 14 may sense the touch even through the flexible display screen 16 and produce the haptic effect as a result. In embodiments in which the display screen 16 includes a touch detecting element, the display screen may provide information to the controller board 20 which identifies a location of the touch event and the controller board 20 subsequently transmits a signal an appropriate haptic element 14 to produce the haptic effect. In still other embodiments, the display screen 16 produces a signal which is transmitted to the appropriate haptic element 14.

As a result of the touch event, the user feels the sensation of touching a mechanical button and the controller board 20 identifies an interactive button 18 that was touched. The controller board 20 further takes action (for example, based on software instructions) to produce an effect based on the touch event. For example, the selected interactive button 18 may correspond to a selection of an HVAC system module. As a result, the controller board 20 may send image signals to the display screen 16 to produce a new image, which may include additional interactive buttons 18. These interactive buttons 18 may correspond to the selected HVAC module, and may provide options for controlling an air conditioning or heating system. The new interactive buttons 18 may be placed in locations corresponding to haptic elements 18 such that a new touch event of one of these buttons can provide a haptic effect to the user. In this way, the display system 10 is capable of acting as a control unit with customizable buttons which provide haptic feedback when pressed by the user.

In another example, the display system 10A is implemented as a keyboard. The keyboard may include a button layout like a mechanical keyboard, including a variety of interactive buttons 18 (each which include a letter or function) arranged in various locations and including a variety of relative sizes. The controller board 20 produces the image of the keyboard which is displayed in the viewable area 24 of the display screen 16.

As shown in FIGS. 2A-2B, each interactive button 18 corresponds to a location of at least one haptic element 14 on the rear side of the display screen 16. In some instances, an interactive button 18 may be sized and positioned to correspond to the location of a plurality of haptic elements 14.

In this example, the user may operate the keyboard by sequentially pressing the display screen 16 in the locations of selected interactive buttons 18 in order to produce a string of letters and/or commands, much like the operation of a mechanical or other virtual keyboard. With each press, a corresponding haptic element 14 produces a haptic effect to provide the user with the feeling of a mechanical button press. In the case of an interactive button 18 which corresponds to more than one haptic element 14, one or more of these haptic elements may be actuated to produce the haptic effect. If all are actuated, the feeling of pressing a larger button (e.g., a space bar) can be provided.

The keyboard may be integrated into a variety of systems and devices. For example, the display system 10A may be integrated into a laptop device in the location where a mechanical keyboard is normally located. This allows keyboard associated with the laptop to be customizable with different layouts, languages, button sizes, font sizes, etc. Moreover, when the keyboard is not in use, the display screen 16 can be used as an additional screen for the laptop to display information from the processing unit of the device.

In another example, the keyboard may be integrated into a tablet device. The tablet device includes the flexible display screen 16 and haptic elements 14. The tablet device can produce an image of a keyboard which is operated by the user in a conventional manner. The haptic elements 14 cooperate with the display screen to provide haptic feedback at the location of a touch event. The keyboard feature can be customized to different layouts, languages, button sizes, font sizes, etc. and can be closed, minimized to allow for other tablet device functions.

Figure 3:
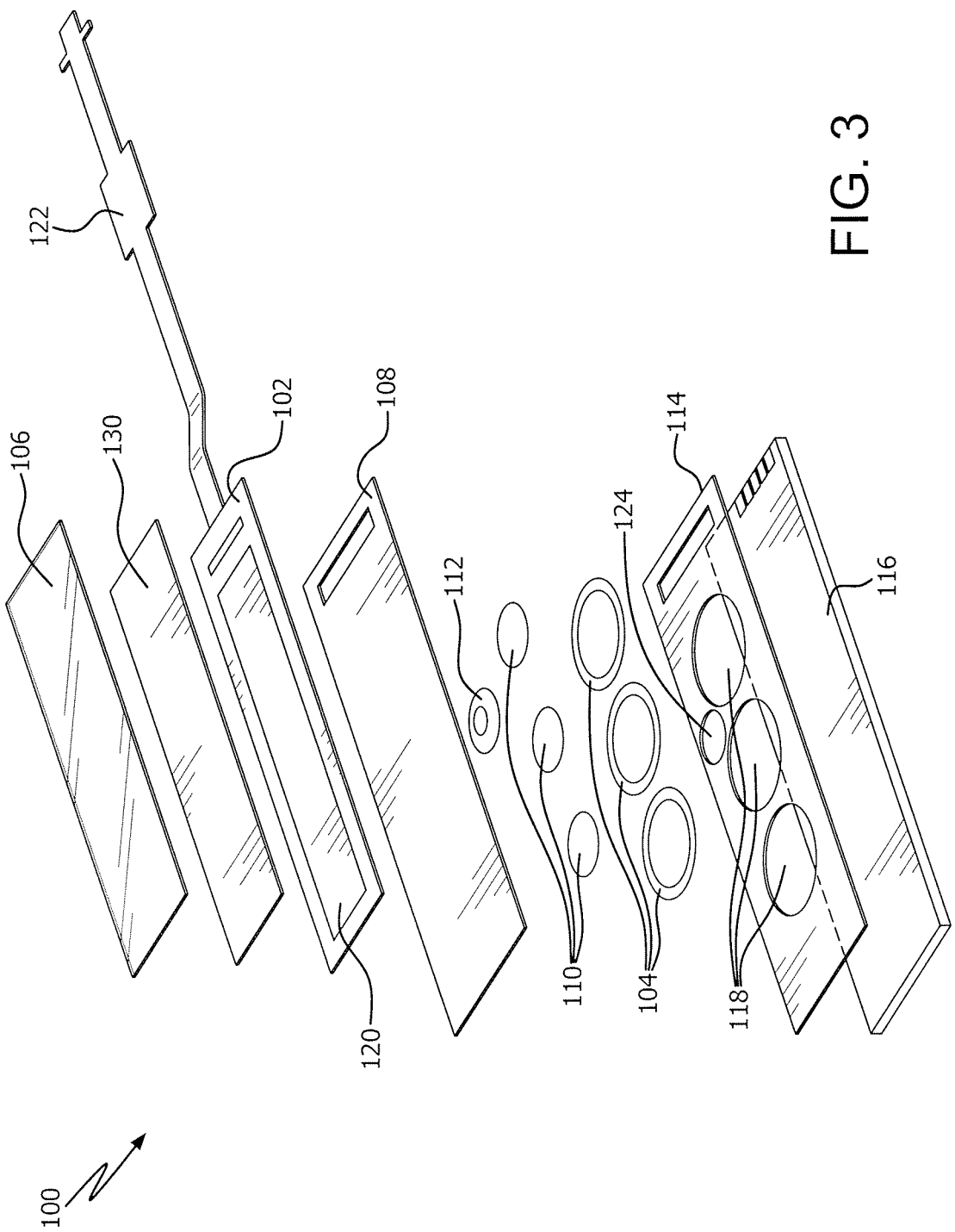
FIG. 3 is an exploded view of an exemplary display system.
Figure 4:
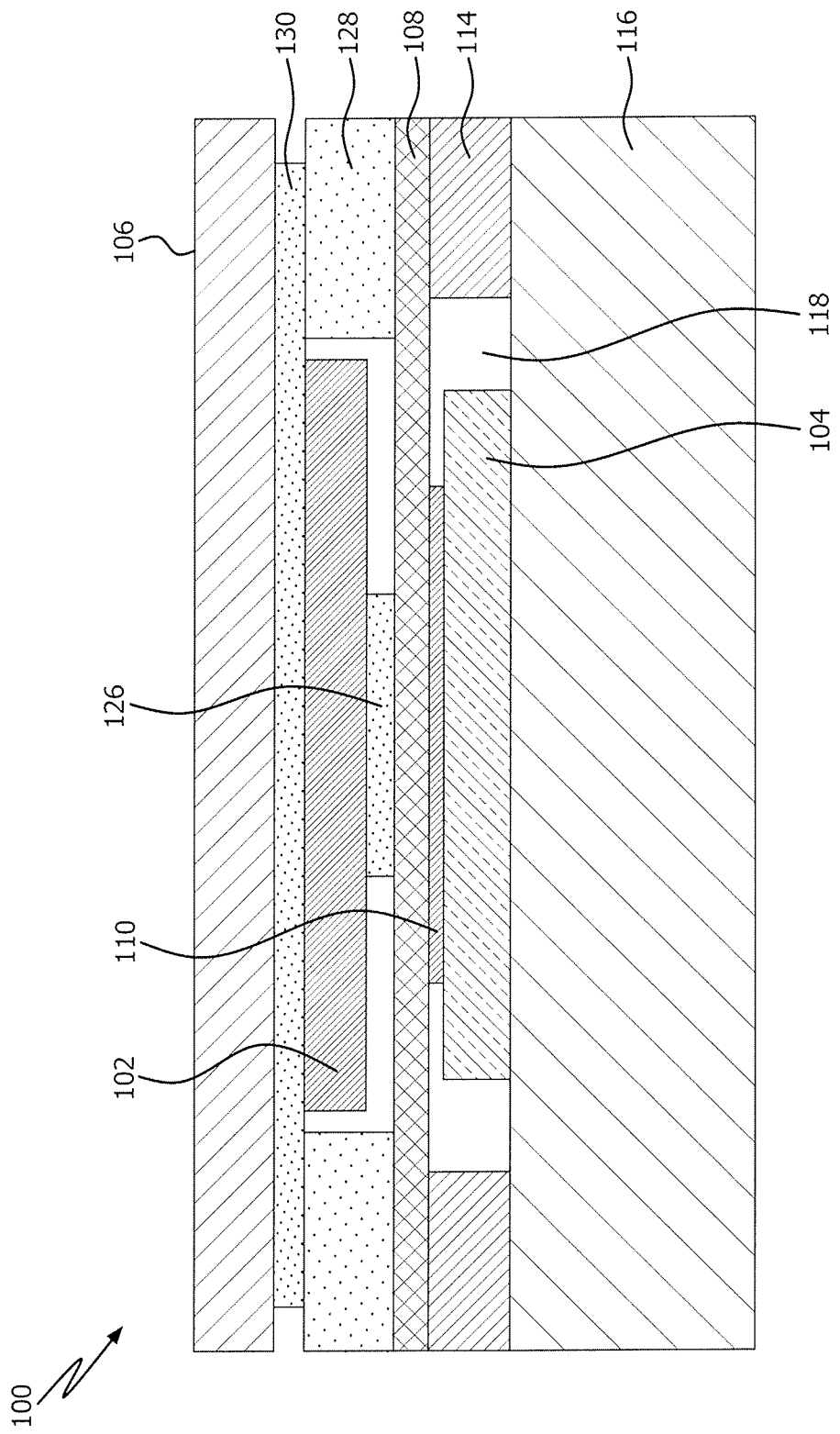
FIG. 4 is a cross-sectional view depicting the various layers of the display system of FIG. 3.
Figure 5:
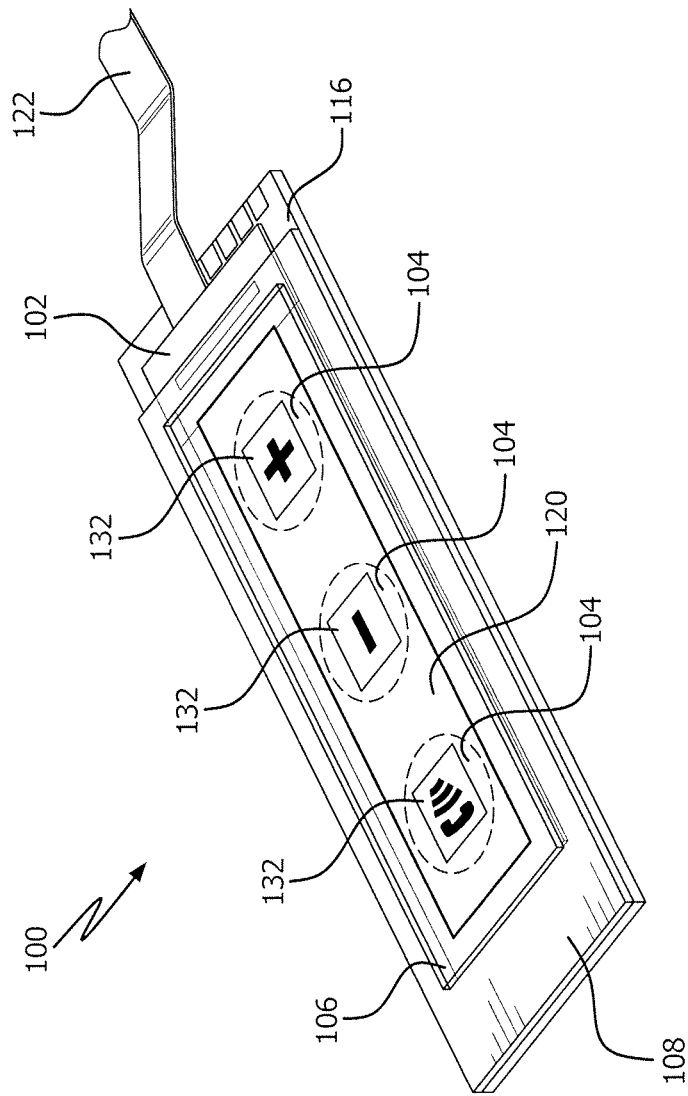
FIG. 5 is a perspective view of the assembly display system.

FIGS. 3-5 illustrate an exemplary embodiment of a display system 100, including various structural components and arrangements that may be implemented in a device consistent with this disclosure. FIG. 3 is an exploded view of the various components of the display system 100. FIG. 4 is a cross sectional view of the display system 100. FIG. 5 is a perspective view of the assembled display system 100.

In an exemplary embodiment, the display system 100 includes a flexible display 102, a plurality of haptic elements 104, a protective cover 106, a conductive foil 108, electrical connectors 110, 112, a spacer 114, and a printed circuit board (PCB) 116. The PCB 116 creates a rigid backing on which the spacer 114, conductive foil 108, flexible display 102, and protective cover 106 are stacked. The spacer 114 include cutouts 118 for receiving the haptic elements 104 therein.

The flexible display 102 may include components which allow the display to operate, including a display screen 120 and an electronic connector 122. The display screen 120 is preferably flexible in that it capable of an amount of elastic bending and flexing without damage. The display screen 120 is preferably an flexible organic light emitting diode display, which allows for display functionality in a thin form factor. In an exemplary embodiment, the flexible display 102 includes a touch registration layer which translates touch input into an input signal for processing by a controller board (e.g., PCB 116 or other controller) which is attached to the electronic connector 122. In other embodiments, touch registration is performed by the haptic elements 114.

The haptic elements 104 are preferably piezoelectric discs which are capable of producing a haptic effect which simulates the pressing of a mechanical button. For example, the haptic elements 104 are each configured to vibrate with a waveform which is tuned to simulate a click or pressure release that accompanies a mechanical button. Each haptic elements 104 is positioned in a respective cutout 118 in the spacer 114. The haptic elements are electrically connected to the PCB 116 through the conductive foil 108 or through placement directly on a conductive element in the circuit.

The haptic elements 104 are preferably spaced from each other by a sufficient distance such that touch and haptic interference is avoided. For example, the haptic elements 104 formed as discs are preferably spaced from an adjacent haptic element 104 (edge to edge) by a distance equal to or greater than half of a radius dimension of the disc. For example, the haptic elements 104 may be formed as 12 mm diameter discs which are spaced from each other with a pitch of approximately 15.3 mm, creating an edge to edge spacing of 3.3 mm.

The haptic elements 104 are electrically connected to the conductive foil 108 by electrical connectors 110, which are sandwiched between the haptic elements 104 and the conductive foil 108. The conductive foil 108 is electrically connected to PCB 116 by the electrical connector 112, which extends through a cutout 124 in the spacer 114. In this way, the haptic elements 104 and PCB 116 are electrically connected to each other. The flexible display 102 is positioned on the conductive foil 108 (e.g., via an adhesive 126) which allows the flexible display 102 to be connected to the PCB 116 in applicable embodiments. Double-sided adhesive 128 and transparent adhesive tape 130 position the protective cover 106 on top of flexible display 102.

The protective cover 106 is an optional feature which may be included to protect the flexible display 102. The protective cover 106 is very thin such as to not interfere with the effect of touching the flexible display 102. For example, the protective cover is approximately 400 μm thick.

The overall thickness of the display system 100 is preferably thin such that promote efficiency in transmitting vibrations from the haptic elements 104 to the user. Moreover, the rigidity and the thickness of the PCB 116 helps to direct the haptic feedback to the user. In an exemplary embodiment, a thickness of the stack from the top of the PCB 116 to the top of the protective cover is less than a thickness of the PCB 116. For example, the thickness of the stack from haptic element 104 to protective cover 106 may be 1.2 mm while the thickness of the PCB 116 is 1.6 mm.

FIG. 5 includes the assembled display system 100. In use, the flexible display 102 produces an image which includes interactive buttons 132. The locations of the interactive buttons 132 correspond to the locations of the haptic elements 104 on the rear side of the flexible display. The display system 100 is configured to recognize a touch event and provide haptic feedback in the location of the touch via a haptic element 104 which corresponds to the selected interactive button 132 location. The display system 100 can be implemented in an environment such as a vehicle to provide a control mechanism having localized haptic feedback. The display system 100 is one example of a basic implementation of the features described herein. It should be understood that the features can be implemented in other configurations.

The disclosed embodiments combine haptic elements and a flexible display to produce localized haptic effects in a customizable device. The flexible nature of the display and the use of spaced-apart haptic elements facilitate the localization of the haptic effect, where previous devices would vibrate an entire screen. This creates a more realistic feeling or pressing a mechanical button. Furthermore, since flexible displays allow finger pressure or the touch force to transfer to the backside of the display, it can reach the haptic element positioned at the back side. Haptic elements which are configured for touch registration can thus be used to eliminate a separate touch layer integrated onto the flexible display. This decreases the cost of the display while maintaining its touch registration cap ability.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A display system, comprising
   a flexible display screen including a front side and a back side;
   a protective cover overlaying the front side of the flexible display screen;
   a plurality of haptic elements arranged in an array on the back side of the screen, wherein a thickness of the protective cover, the flexible display screen, and the plurality of haptic elements is less than 1.3 mm;
   a plurality of electrical connectors, each of the plurality of haptic elements is paired with one of each of the plurality of electrical connectors on a first side;
   a controller board connected to the plurality of haptic elements and the flexible display screen and configured to receive and transmit signals to and from the plurality of haptic elements and the flexible display screen and to produce a display of interactive buttons on the front side of the flexible display screen in locations corresponding to the plurality of haptic elements;
   a PCB;
   a conductive foil located between the back side of the flexible display screen and the PCB; and
   a spacer located between the conductive foil and the PCB and including a plurality of holes for each of the plurality of haptic elements to extend through from the PCB on a second side, and each of the plurality of electrical connectors on the first side connecting to the conductive foil, such that the haptic element is physically spaced from the conductive foil, wherein the controller board is configured to produce different configurations of the interactive buttons on the same flexible display screen at different times, the plurality of haptic elements are piezoelectric discs configured to provide haptic feedback based on touch input provided to the front side of the screen and to detect a touch event with the controller board based on the input provided to the front side of the screen, the haptic feedback comprising actuating at least one haptic element which detects the touch input, the interactive buttons include at least one first interactive button corresponding to a location of a plurality of haptic elements, and all of the plurality of haptic elements are actuated in response to touch input detected by at least one haptic element of the plurality of haptic elements, and a different electrical connector extends through a first hole of the plurality of holes in the spacer from the PCB to the conductive foil, and the conductive foil is electrically connected to the PCB via the different electrical connector.

2. The display system of claim 1, wherein the flexible display screen is a passive screen.

3. The display system of claim 1, wherein the plurality of haptic elements are mounted on the PCB.

4. The display system of claim 3, wherein the thickness of the protective cover, the flexible display screen, and the plurality of haptic elements the is less than a thickness of the PCB.

5. The display system of claim 4, wherein a thickness of the PCB is about 1.6 mm.

6. The display system of claim 1, further including a protective cover which forms a touch surface including a thickness of less than 500 µm.

7. The display system of claim 1, wherein the flexible display screen is an OLED display.

8. The display system of claim 1, wherein the flexible display is implemented as a keyboard.

9. The display system of claim 8, wherein the flexible display is second screen in a laptop computer.

10. The display system of claim 1, wherein the flexible display is implemented in a vehicle.

\* \* \* \* \*